(12) United States Patent
Mullen (10) Patent No.: US 8,567,964 B2
(45) Date of Patent: Oct. 29, 2013

(54) ULTRAVIOLET RETROREFLECTORS

(75) Inventor: Patrick W. Mullen, Barkhamsted, CT (US)

(73) Assignee: ORAFOL Americas Inc., Avon, CT (US)

(*) Notice: Subject to any disclaimer, the term of this patent is extended or adjusted under 35 U.S.C. 154(b) by 231 days.

(21) Appl. No.: 12/995,359

(22) PCT Filed: Jun. 1, 2009

(86) PCT No.: PCT/US2009/045817
§ 371 (c)(1),
(2), (4) Date: Nov. 30, 2010

(87) PCT Pub. No.: WO2009/146446
PCT Pub. Date: Dec. 3, 2009

(65) Prior Publication Data
US 2011/0080637 A1    Apr. 7, 2011

Related U.S. Application Data

(60) Provisional application No. 61/130,383, filed on May 30, 2008.

(51) Int. Cl.
*G02B 5/124*    (2006.01)

(52) U.S. Cl.
USPC .................................................... 359/530

(58) Field of Classification Search
USPC .................. 359/529, 530, 534–540, 543
See application file for complete search history.

(56) References Cited

U.S. PATENT DOCUMENTS

| | | | |
|---|---|---|---|
| 3,700,305 A | 10/1972 | Bingham | |
| 4,917,447 A | 4/1990 | Newnam | |
| 6,350,034 B1* | 2/2002 | Fleming et al. | 359/529 |
| 2002/0071183 A1 | 6/2002 | Mullen et al. | |
| 2003/0016368 A1 | 1/2003 | Aman et al. | |
| 2003/0089854 A1 | 5/2003 | Shifflett et al. | |
| 2005/0185279 A1 | 8/2005 | Mullen et al. | |
| 2006/0124511 A1* | 6/2006 | Khalfan et al. | 209/577 |
| 2006/0215147 A1 | 9/2006 | Scott et al. | |

FOREIGN PATENT DOCUMENTS

| | | |
|---|---|---|
| EP | 1278078 A2 | 1/2003 |
| EP | 1278078 A3 | 1/2005 |

OTHER PUBLICATIONS

Newport Ind. Glass: HOYA U-340 Filter. Datasheet (online). Newport Industrial Glass, Inc., http://web.archive.org/web/20060325045547/http://www.newportglass.com/hoyu340.htm (2006).
PCT International Search Report for PCT/US2009/045817, filed Jun. 1, 2009, completed Jul. 4, 2009.
PCT International Written Opinion for PCT/US2009/045817, filed Jun. 1, 2009, mailed Jul. 21, 2009.
Delaboudiniere et al., "Extreme Ultraviolet Reflectors with Metal-Oxide Multilayered Structures," Applied Optics 25 (5):1266-1267 (1986).
Foltyn et al., "Alumina/Silica Multilayer Coatings for Excimer Lasers," Oral Presentation at the Fifteenth Annual Symposium on Optical Materials for High-Power Lasers, National Bureau of Standards, Boulder, CO., 7 pp. (Nov. 14-16, 1983).
Kang et al., "Structural Characterization of Mo/Ru/Si EUV Reflector by Optical Modeling," 43(6B):3700-3702 Jpn. J. Appl. Phys. Part 1 Regul. Pap. Short Note Rev. Pap. (2004).

* cited by examiner

*Primary Examiner* — Euncha Cherry
(74) *Attorney, Agent, or Firm* — LeClairRyan, a Professional Corporation (57) ABSTRACT

A waveband selective retroreflective article, comprising a body layer having a plurality of concave retroreflective elements, each said concave retroreflective element forming a cavity having open-face surfaces and an additional layer that includes particles of a wave-band selective material.

22 Claims, 8 Drawing Sheets

ULTRAVIOLET RETROREFLECTORS

This application is a National Stage of International Application No. PCT/US2009/045817, filed Jun. 1, 2009, which claims the benefit of U.S. Provisional Patent Application Ser. No. 61/130,383 filed on May 30, 2008, which is herein incorporated by reference in its entirety.

FIELD OF THE INVENTION

This invention generally relates to retroreflective products and, more particularly, ultraviolet retroreflective articles.

BACKGROUND

For certain applications of retroreflective products, it is desirable to allow retroreflection in the ultraviolet (UV) portion of the spectrum, while blocking or absorbing the visible (VIS) or the visible and infrared (VIS/IR) portions. Commonly available retroreflective products contain certain organic compounds that absorb in the ultraviolet (UV) portion of the spectrum, thus rendering such retroreflective products unsuitable for use at wavelength shorter than about 380 nm. The existing devices that selectively retroreflect in the UV spectrum employ glass filters, rendering these retroreflectors fragile, rigid, heavy, and bulky.

SUMMARY OF THE INVENTION

Embodiments of the present invention provide lightweight and flexible retroreflective materials that operate in the UV waveband, while absorbing or otherwise blocking the VIS or (VIS/IR) portions of the spectrum.

In one embodiment, the present invention is a waveband selective retroreflective article, comprising a body layer comprising a plurality of concave retroreflective elements, each said concave retroreflective element forming a cavity having open-face surfaces; a specular metal layer disposed over the open-face surfaces; and a filler layer disposed over the specular metal layer, said filler layer filling at least one cavity formed by at least one concave retroreflective element. The filler layer includes particles of a wave-band selective material. The waveband selective retroreflective article selectively retroreflects light in the UV waveband band.

In another embodiment, the present invention is a waveband selective retroreflective article, comprising a body layer comprising a plurality of concave retroreflective elements, each said concave retroreflective element forming a cavity having open-face surfaces; a specular metal layer disposed over the open-face surfaces; a filler layer disposed over the specular metal layer, said filler layer filling at least one cavity formed by at least one concave retroreflective element; and a top layer disposed over the filler layer. The top layer includes particles of a wave-band selective material. The waveband selective retroreflective article selectively retroreflects light in the UV waveband band.

In another embodiment, the present invention is a waveband selective retroreflective article, comprising a body layer; and a plurality of spherical lens elements partially embedded into the body layer, wherein said spherical lens elements comprise a phosphate glass that includes cobalt, nickel, or a combination of cobalt and nickel. The wave-band selective retroreflective article selectively retroreflects light in the UV waveband band.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. The present invention is a retroreflecting material that reflects electromagnetic radiation in the UV portion of the spectrum while exhibiting little or no reflectance in the VIS or VIS/IR portions.

Figure 1:
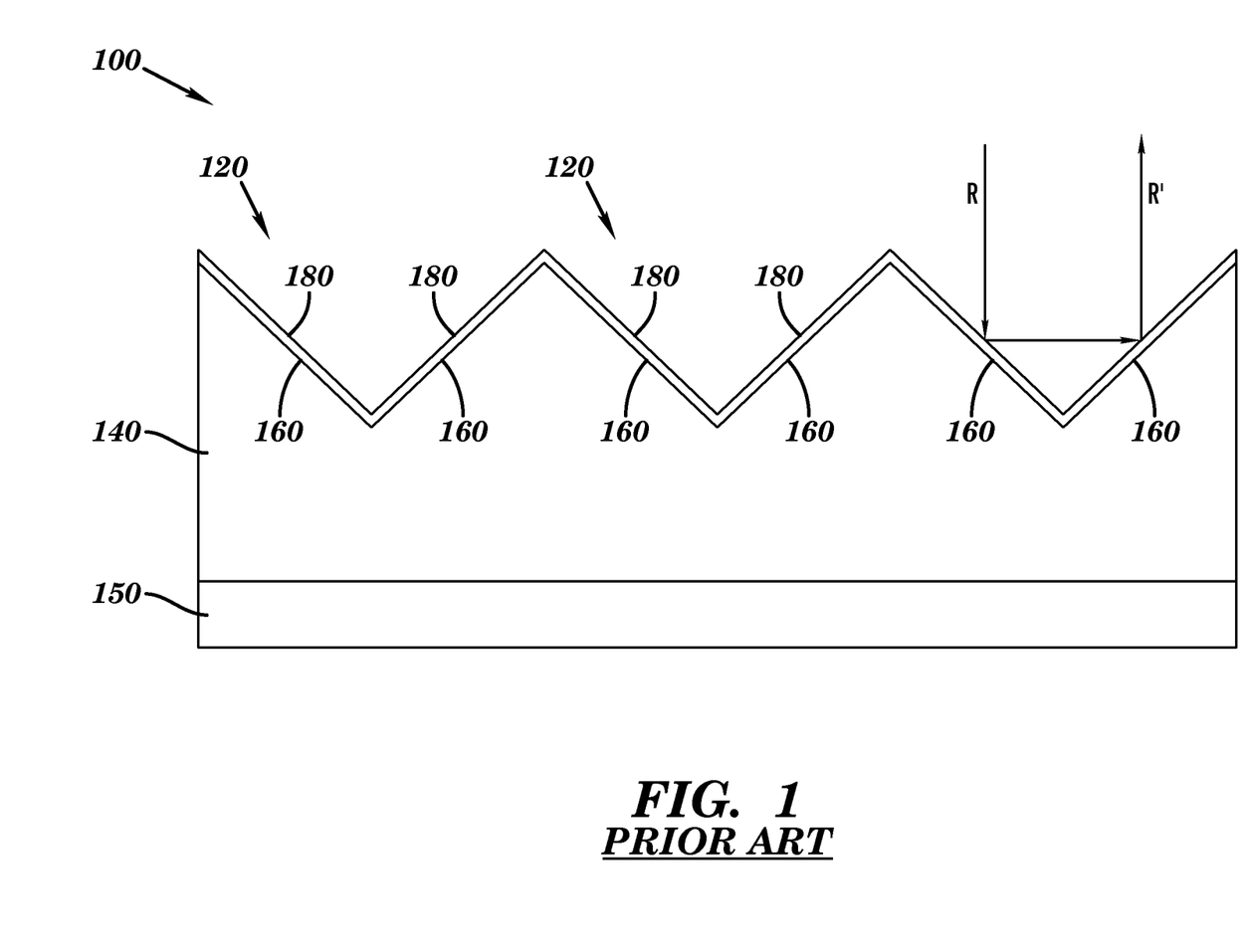
FIG. 1 is a schematic diagram showing an open-face cube-corner retroreflective material.

Referring to FIG. 1, a schematic diagram of a retroreflective article 100 comprising a plurality of concave retroreflective elements 120 is illustrated, although the article could comprise other types and numbers of elements. Each concave retroreflective element 120 forms a cavity in the body layer 140 bounded by surfaces 160. In the embodiment shown in FIG. 1, an optional bottom carrier layer 150 supports the body layer 140. The body layer 140 can be formed of a variety of materials such as polymeric epoxies, acrylics polyester, polyurethane, polyurea polycarbonate or the like. The optional layer 150 can be made from a material that is independently selected from polymeric epoxies, acrylics, polyester, polyurethane, polyurea, polycarbonate or the like and can further be selected to be transparent or non-transparent. These materials may incorporate inorganic fillers that enhance physical properties of the product. In certain embodiments, a specular (reflective) coating 180, such as a layer of a metal (e.g., aluminum, gold, silver, platinum, rhodium, or a combination thereof) is formed on the surfaces 160. Coating 180 is permanently attached in this embodiment, i.e., not easily removable, to the surfaces 160. In other embodiments, sections of coating 180 can be removed, for example, using chemical etching or plasma etching processes. The surfaces 160 are aligned with respect to one another to retroreflect an incoming light ray R substantially parallel to its incoming entrance angle. In one embodiment, the surfaces 160 are planar with one surface being disposed substantially at an angle of 90° to the next surface. Preferably, surfaces 160 comprise open-faced "cube-corner" surfaces, which are three surfaces disposed substantially at an angle of 90° to one another. In this embodiment, three surfaces 160 form a cavity having a "nadir", i.e. a point where all three surfaces 160 intersect. The nadir of the surfaces 160 is spaced preferably with a pitch in the range of between about 25.4 and 508 µm (0.001 and 0.020 inches). Preferably, the incoming light ray R internally reflects off of the three surfaces such that the outgoing light R' is substantially parallel to the incoming light ray R, regardless of the entrance angle.

Figure 2:
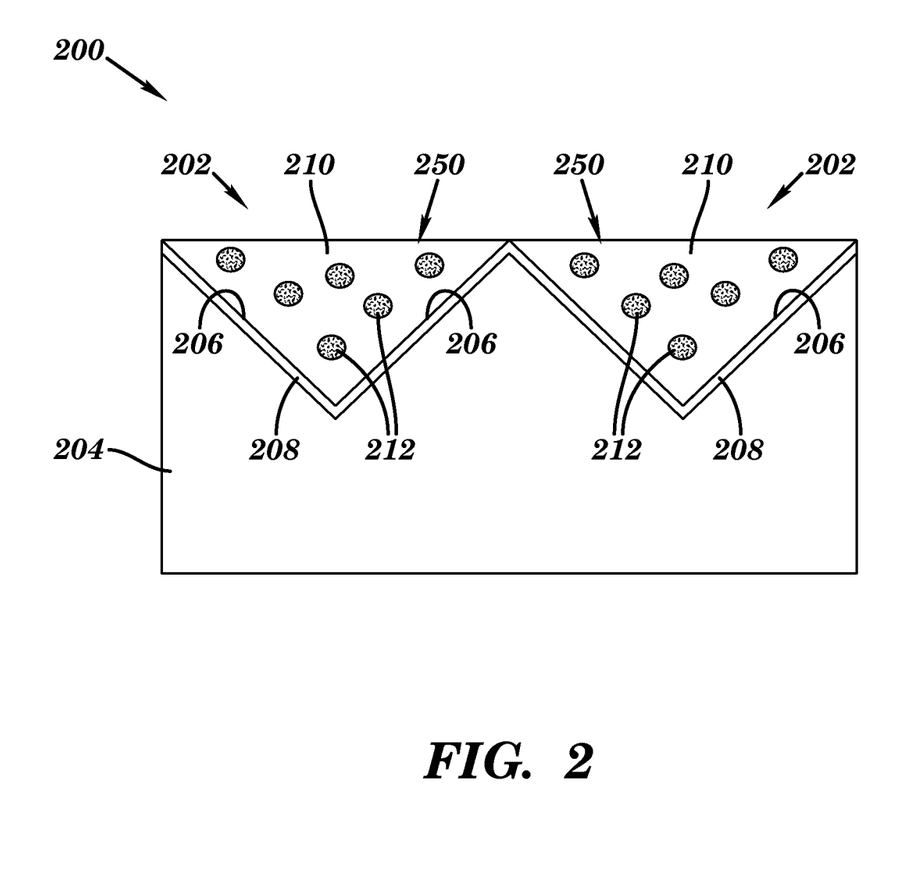
FIG. 2 is a schematic diagram of one embodiment of a waveband-selective retroreflective material of the present invention.

Referring to FIG. 2, one embodiment of a waveband selective retroreflective article 200 of the present invention is shown. The retroreflective article 200 comprises a plurality of concave retroreflective elements 202, each said concave retroreflective element 202 forming a cavity in a body layer 204. Each cavity is bounded by open-face surfaces 206. A specular metal layer 208 is disposed over the open-face surfaces 206 of at least one concave retroreflective element 202. An optionally discontinuous filler layer 210 is disposed over the specular metal layer 208, so that the filler layer 210 fills at least one cavity formed by a respective concave retroreflective element 202, although the filler layer could be continuous. In the embodiment shown in FIG. 2, the filler layer 210 includes particles 212 of a wave-band selective material. During operation, the waveband selective retroreflective article 200 selectively retroreflects light in the UV waveband band.

Preferably, the concave retroreflective elements 202 are open-faced cube corner elements, as described above with respect to FIG. 1. The body layer 204, which may include an optional bottom carrier layer, is as described above with reference to FIG. 1. The specular metal layer 208 can comprises any of the metals or combinations there listed above with reference to the specular layer 180 (FIG. 1). Preferably, specular layer 208 comprises aluminum. The filler layer 210 can be continuous. Alternatively, the filler layer 210 can comprises a plurality of discontinuous filler elements 250, each said filler element 250 filling a respective concave retroreflective element 202.

The filler layer 210 can comprise a polymer matrix that is transparent in the UV waveband. Examples of such polymers include polyvinyl chloride (PVC), polytetrafluoroethylene, perfluoroalkoxy polymer, fluorinated ethylene propylene, and acrylate polymers. In one embodiment, the filler layer can be a cross-linked silicon polymer (siloxane), such as Syl Gard 186 available from Dow Corning Corporation.

The body layer 204 can be made from the materials described above with reference to the body layer 140 of the retroreflective articles 100 (FIG. 1).

The wave-band selective material from which particles 212 can be made preferably has the value of the transmittance in the UV waveband that is higher than one or both the value of the transmittance in the visible waveband or the value of the transmittance in the IR waveband. In one embodiment, the particles of the waveband selective material 212 comprises a phosphate glass that includes cobalt, nickel, or a combination of cobalt and nickel Examples of such material include particles of UG5 glass available from Schott North America, and U-340 glass, available from Hoya Corporation USA. Preferably, the particles of the waveband selective material 212 are less than about 10 µm in size.

Figure 3:
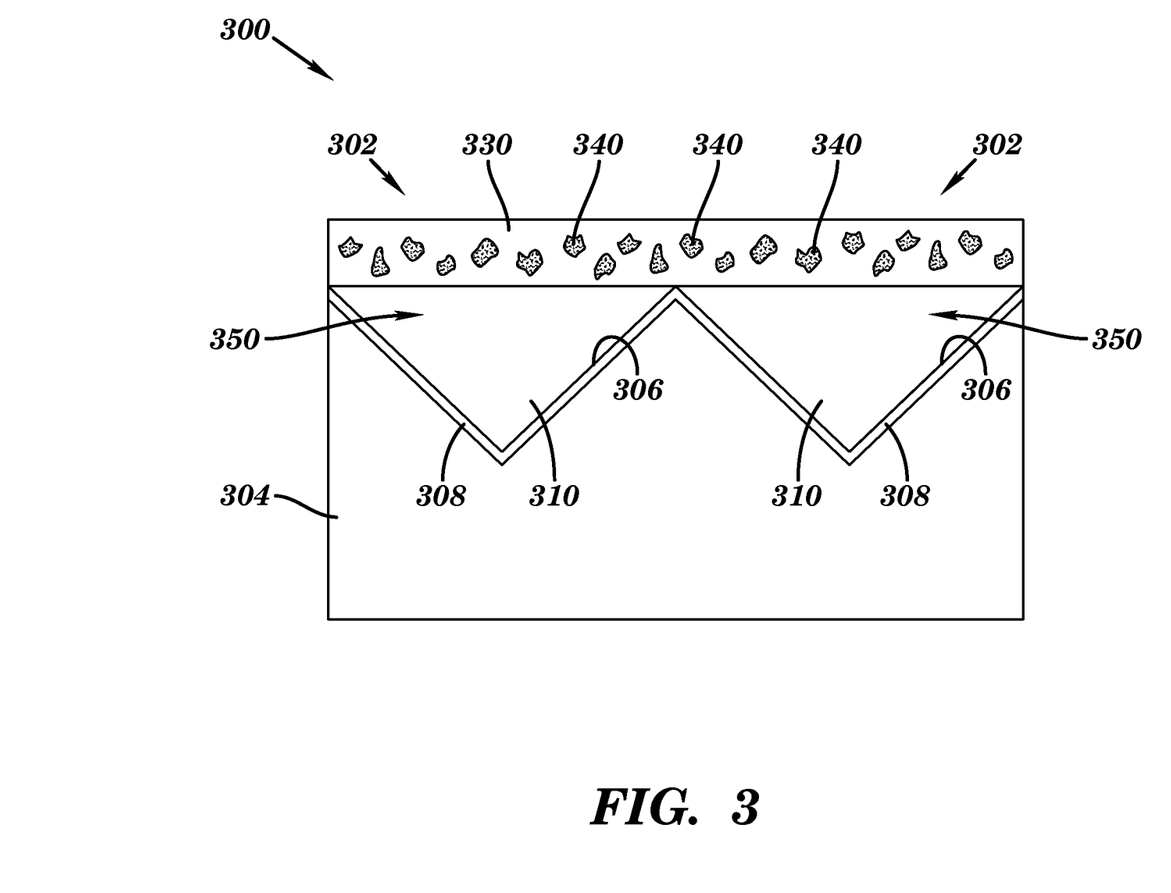
FIG. 3 is a schematic diagram of one embodiment of a waveband-selective retroreflective material of the present invention.

An alternative embodiment of a waveband selective retroreflective article of the present invention is shown in FIG. 3. The retroreflective article 300 comprises a plurality of concave retroreflective elements 302, each said concave retroreflective element 302 forming a cavity in a body layer 304. Each cavity formed by the retroreflective elements 302 is bounded by open-face surfaces 306. A specular metal layer 308 can be disposed over the open-face surfaces 306 of at least one cavity formed by a respective concave retroreflective element 302. An optionally discontinuous filler layer 310 is disposed over the specular metal layer 308, so that the filler layer 310 fills at least one cavity formed by at least one concave retroreflective element 302. The retroreflective article 300 further comprises a top layer 330 disposed over the filler layer 310. The top layer 330 includes particles 340 of a wave-band selective material. During the operation, the waveband selective retroreflective article 300 selectively retroreflects light in the UV waveband band.

Preferably, the concave retroreflective elements 302 are open-faced cube corner elements, as described above with reference to FIG. 1. The body layer 304, which may include an optional bottom carrier layer, is as described above with reference to FIG. 1.

The specular metal layer 308 can comprises any of the metals or combinations there listed above with reference to the specular layer 180 (FIG. 1). Preferably, specular layer 308 comprises aluminum.

In one embodiment, the filler layer 310 comprises a plurality of discontinuous filler elements 350, each said filler elements 350 filling a respective concave retroreflective element 302 Alternatively, the filler 310 can be a continuous layer.

Preferably, the waveband selective material of particles 340 has the value of the transmittance in the UV waveband that is higher than one or both the value of the transmittance in the visible waveband or the value of the transmittance in the IR waveband. Examples of such material are described above with respect to particles 212 (FIG. 2). Preferably, the particles 340 of the waveband selective material are not greater than about 1 µm in size.

The body layer 304 can be made from a first polymer material described above with reference to the body layer 140 of the retroreflective articles 100 (FIG. 1). The filler layer 310 can be made from the materials described above with reference to the filler layer 210 (FIG. 1). The top layer 330 can be made from a second polymeric material independently selected from the group consisting of polyvinyl chloride (PVC), polytetrafluoroethylene, perfluoroalkoxy polymer, fluorinated ethylene propylene, acrylate polymers, or silicone.

Examples of open-face retroreflective materials and methods of manufacturing same that can be adopted for use with the present invention are known in the art and are described, e.g., in U.S. Pat. No. 6,967,053 and US2005/0185279, the entire teachings of which are incorporated herein by reference.

Figure 4:
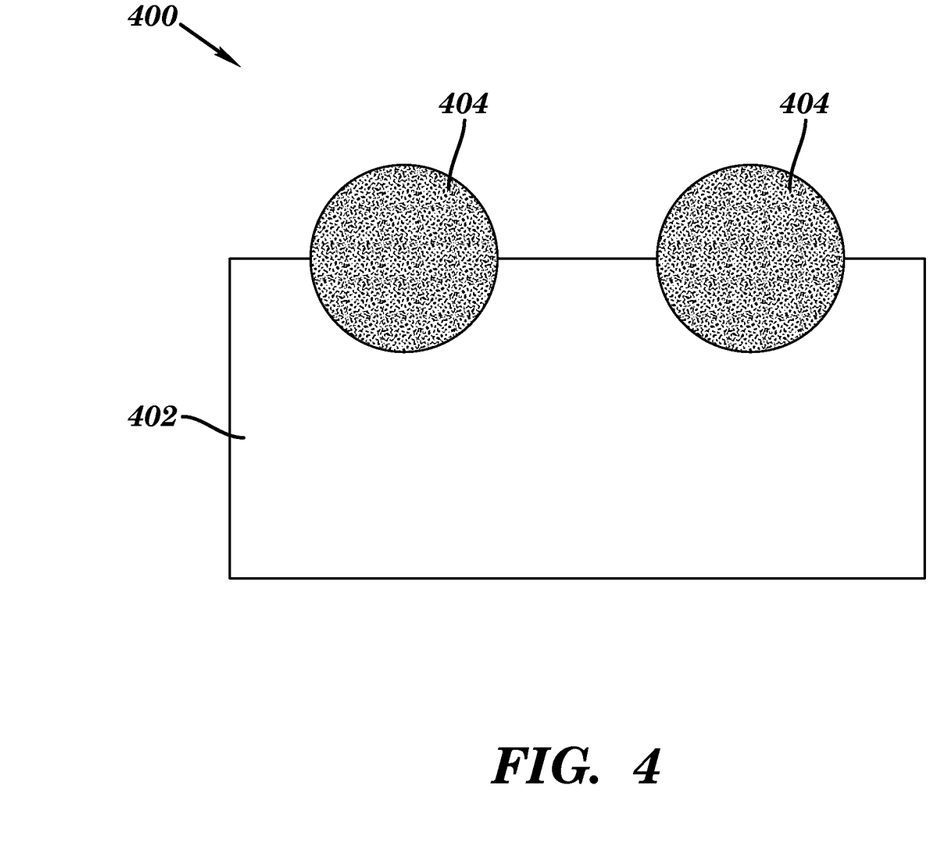
FIG. 4 is a schematic diagram of one embodiment of a waveband-selective retroreflective material of the present invention.

An alternative embodiment of a waveband selective retroreflective article 400 in accordance with the present invention is shown in FIG. 4. The retroreflective article 400 comprises a body layer 402, and a plurality of spherical lens elements 404 partially embedded into the body layer 402. The spherical lens elements 404 comprise a phosphate glass that includes cobalt, nickel, or a combination of cobalt and nickel. During the operation, the wave-band selective retroreflective article 400 selectively retroreflects light in the UV waveband band.

The examples of a phosphate glass that includes cobalt, nickel, or a combination of cobalt and nickel are described above with reference to particles 212 (FIG. 2) and particles 340 (FIG. 3). The materials from which the body layer 402 can be made are described above with reference to body layers 204 (FIG. 2) and 304 (FIG. 3). The methods of manufacturing that can be employed for producing retroreflective articles 400 are known in the art and are described, e.g., in U.S. Pat. No. 3,700,305, the entire teachings of which are incorporated herein by reference.

Figure 5A:
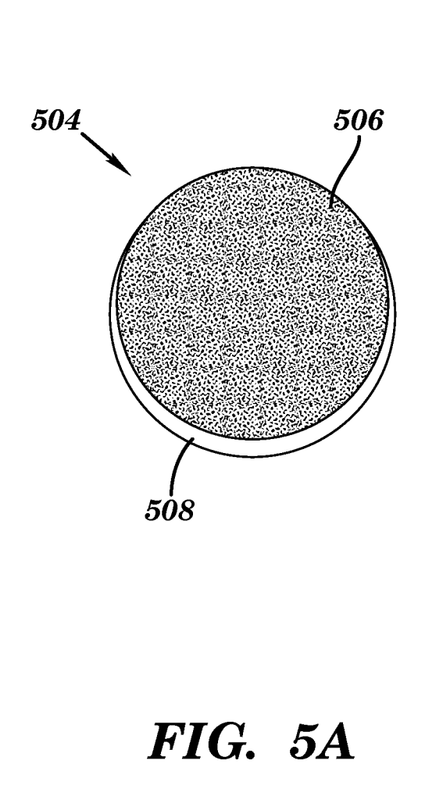
FIG. 5A and FIG. 5B are illustrations of various embodiment of the spherical lens elements used by an embodiment of the present invention.
Figure 5B:
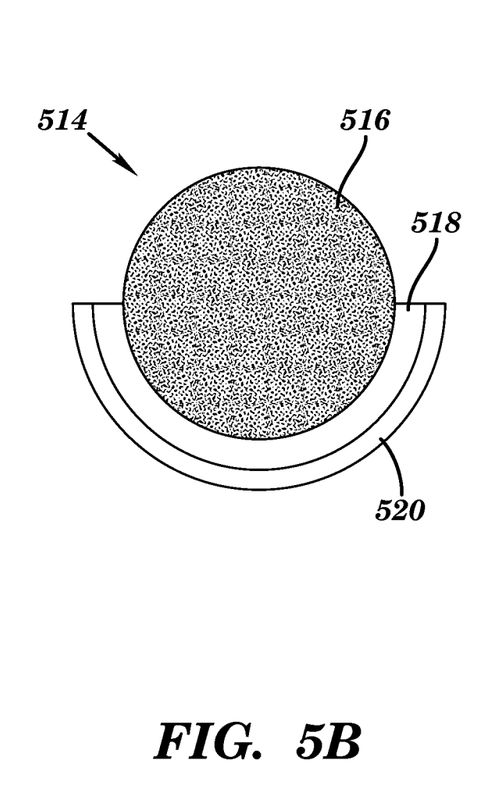

With reference to FIG. 5A and FIG. 5B, alternative embodiments of spherical lens elements 504 and 514 are shown. As shown in FIG. 5A, in one embodiment, a spherical lens element 504 can include a bead 506, that comprises a phosphate glass that includes cobalt, nickel, or a combination of cobalt and nickel, and a specular metal layer 508, disposed on a portion of a surface of the bead 506. Alternatively, as shown in FIG. 5B, the spherical lens element 514 can include a bead 516 that comprises a phosphate glass that includes cobalt, nickel, or a combination of cobalt and nickel, a spacer layer 518 disposed on at least a portion of a surface of the bead 516; and a specular metal layer 520 disposed on a portion of the spacer layer 518.

The specular metal layers 508 and 520 can comprise the materials described above with reference to specular metal layers 208 (FIG. 2) and 308 (FIG. 3). Preferably, the specular metal layers 508 and 520 comprise aluminum.

The spacer layer 518 preferably comprises a polymer transparent in the UV waveband. Examples of such polymers include polyvinyl butyral polymers, acrylate polymers, and polyolefins (polyalkenes) such as polyethylene and polypropylene.

The spherical lens elements 504 and 514 are from about 50 μm to about 500 μm in size.

Example 1

Transmittance of UG5 Glass (Schlott North America) as a Function of Wavelength

The transmittance of the UG5 glass available from Schlott North America as a function of wavelength was investigated. The results are presented in FIG. 6 (transmittance-solid lines) (internal transmittance-dashed lines).

Figure 6:
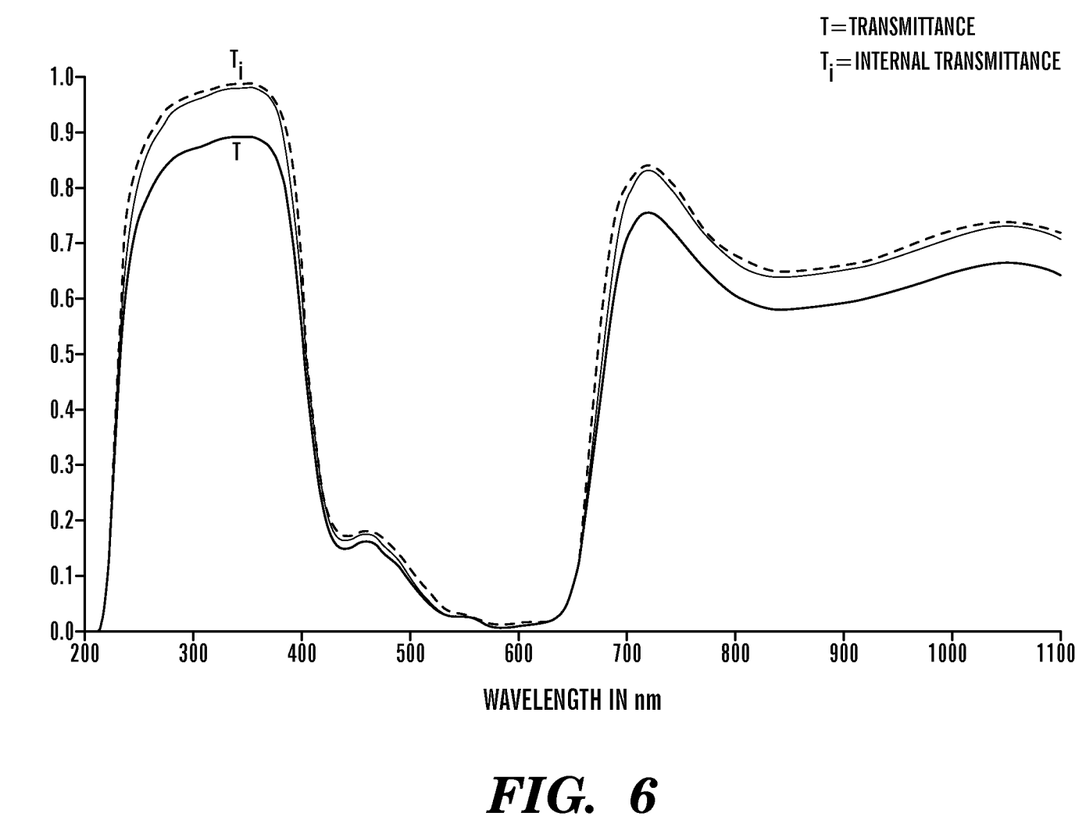
FIG. 6 is a plot showing transmittance of electromagnetic radiation by a phosphate glass, UG-5, available from Schott North America as a function of wavelength.

As can be seen from FIG. 6, UG5 type glass possesses high transmittance in the UV portion of the spectrum (wavelength of less than about 380 nm), and very low transmittance at the visible range (from about 380 nm to about 750 nm). The transmittance is intermediate at the wavelengths above 750 nm (i.e. in the IR waveband).

These results indicate that UG5 glass from Schott North America is suitable for use with the waveband-selective retroreflective articles of the present invention as it will effectively permit retroreflection in the UV waveband while blocking the VIS waveband and partially blocking the IR waveband.

It is understood that any material having similar transmittance characteristics is also suitable for use with the present invention.

Example 2

Transmittance of U-340 Glass (Hoya Glass Co.) as a Function of Wavelength

Figure 7A:
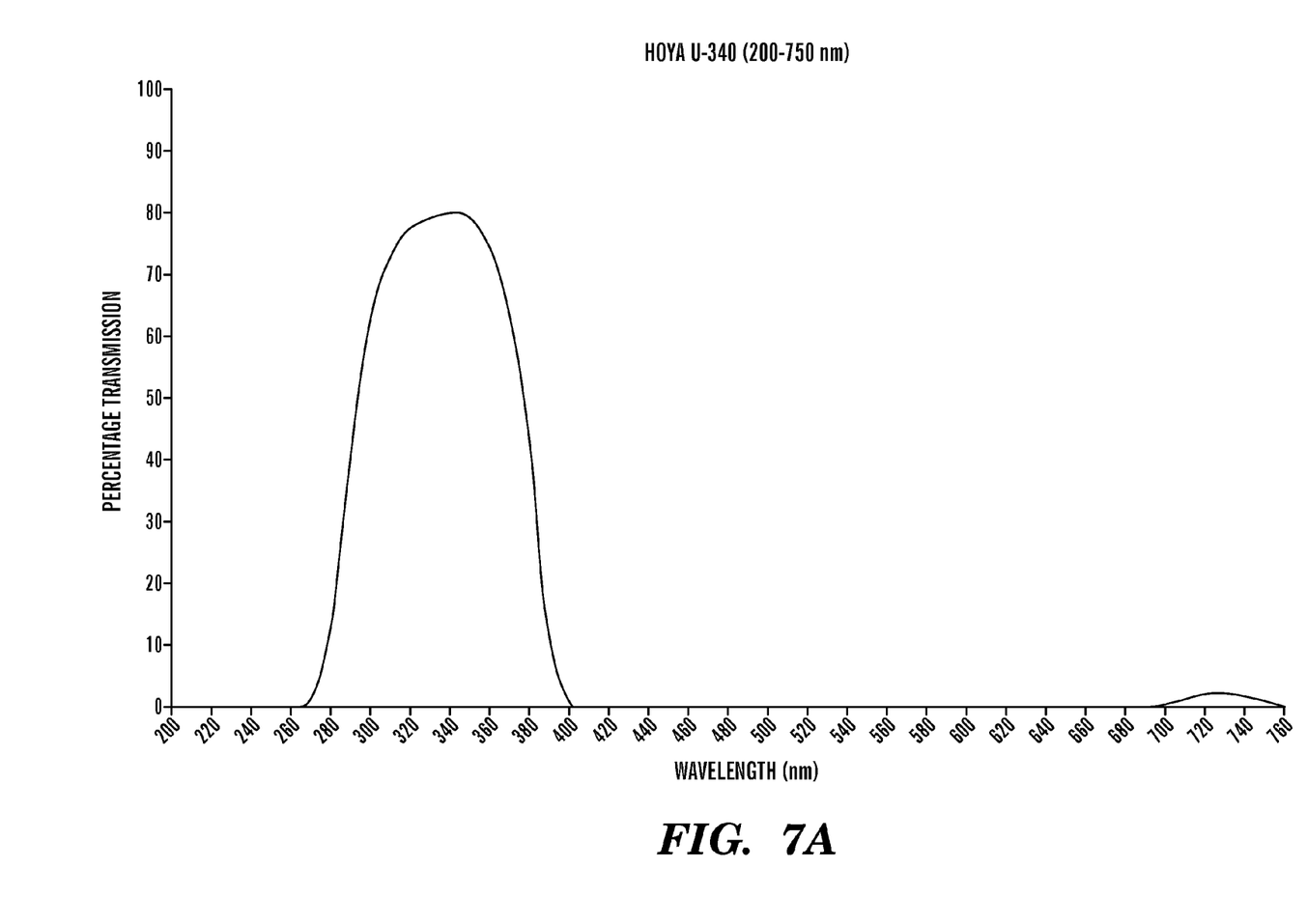
FIG. 7A is a plot showing the transmittance of electromagnetic radiation having a wavelength from 200 nm to 750 nm by a phosphate glass, U-340, available from Hoya Glass Co.
Figure 7B:
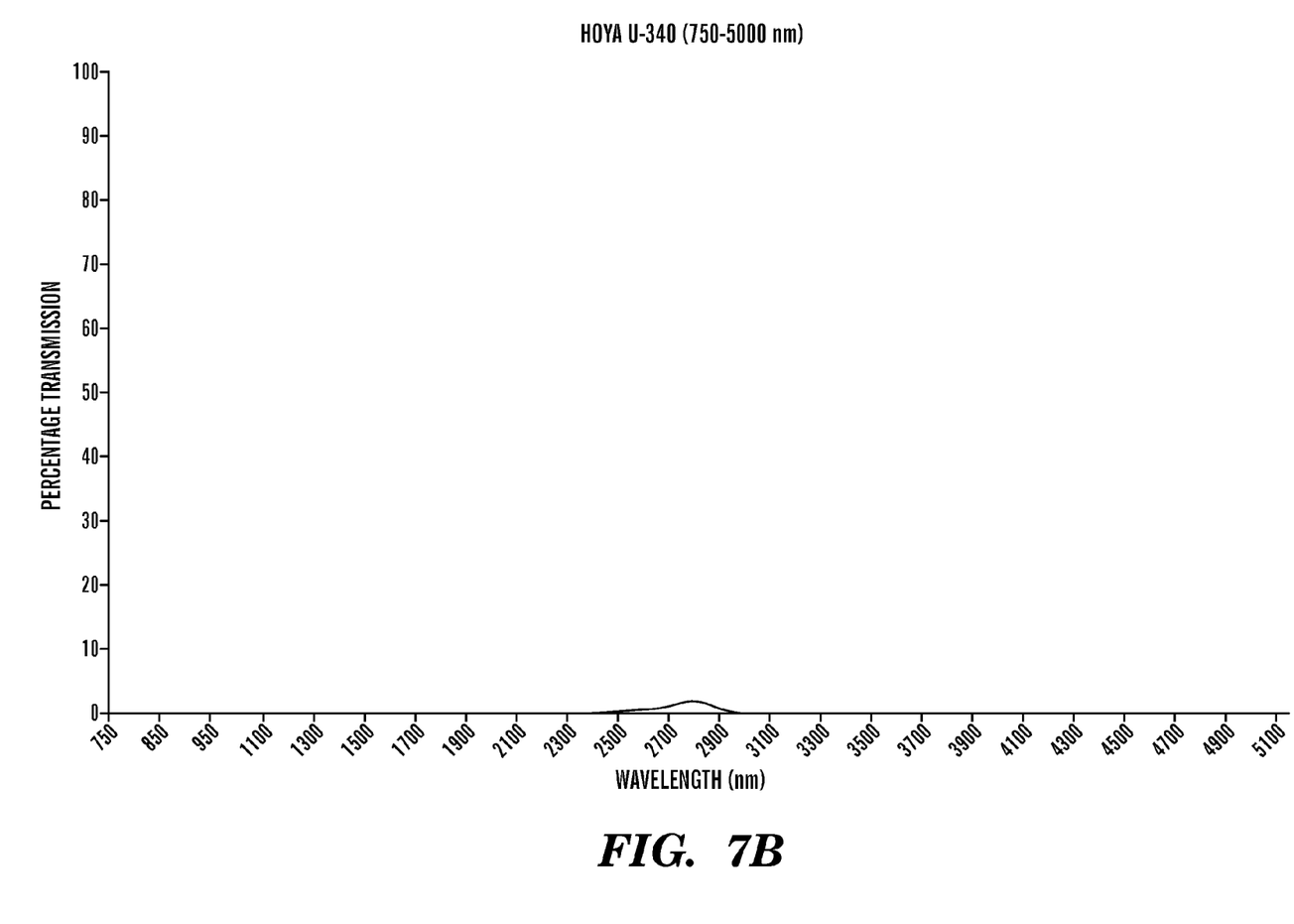
FIG. 7B is a plot showing the transmittance of electromagnetic radiation having a wavelength from 750 nm to 4900 nm by a phosphate glass, U-340, available from Hoya Glass Co.

FIGS. 7A and 7B show the transmittance of U-340 glass available from Newport Industrial Glass Inc. in Stanton, Calif.

While this invention has been particularly shown and described with references to example embodiments thereof, it will be understood by those skilled in the art that various changes in form and details may be made therein without departing from the scope of the invention encompassed by the appended claims.

What is claimed is:

1. A waveband selective retroreflective article, comprising:
    a body layer comprising a plurality of concave retroreflective elements, each said concave retroreflective element forming a cavity having open-face surfaces;
    a specular metal layer disposed over the open-face surfaces; and
    a filler layer disposed over the specular metal layer, said filler layer filling at least one cavity formed by at least one concave retroreflective element,
    wherein the filler layer includes particles of a wave-band selective material, and
    wherein the waveband selective retroreflective article selectively retroreflects light in the UV waveband band.

2. The retroreflective article of claim 1, wherein the concave retroreflective elements are open-faced cube corner elements.

3. The retroreflective article of claim 1, wherein the specular metal layer comprises aluminum.

4. The retroreflective article of claim 1, wherein the filler layer comprises a plurality of discontinuous filler elements, each said filler elements filling a respective cavity formed by a respective concave retroreflective element.

5. The retroreflective article of claim 1, wherein the filler layer is a continuous layer.

6. The retroreflective article of claim 1, wherein the waveband selective material has the value of the transmittance in the UV waveband that is higher than one or both the value of the transmittance in the visible waveband or the value of the transmittance in the IR waveband.

7. The retroreflective article of claim 1, wherein the particles of the waveband selective material comprises a phosphate glass that includes cobalt, nickel, or a combination of cobalt and nickel.

8. The retroreflective article of claim 7, wherein the particles of the waveband selective material are from about 10 μm to about 50 μm in size.

9. The retroreflective article of claim 1, wherein the filler layer comprises a polymer transparent in the UV waveband.

10. The retroreflective article of claim 9, wherein the polymer transparent in the UV waveband is selected from the group consisting of polyvinyl chloride (PVC), polytetrafluoroethylene, perfluoroalkoxy polymer, fluorinated ethylene propylene, acrylate polymers and silicones.

11. A waveband selective retroreflective article, comprising:
    a body layer comprising a plurality of concave retroreflective elements, each said concave retroreflective element forming a cavity having open-face surfaces;
    a specular metal layer disposed over the open-face surfaces;
    a filler layer disposed over the specular metal layer, said filler layer filling at least one cavity formed by at least one concave retroreflective element; and
    a top layer disposed over the filler layer,
    wherein the top layer includes particles of a wave-band selective material, and
    wherein the waveband selective retroreflective article selectively retroreflects light in the UV waveband band.

12. The retroreflective article of claim 11, wherein the concave retroreflective elements are open-faced cube corner elements.

13. The retroreflective article of claim 11, wherein the specular metal layer comprises aluminum.

14. The retroreflective article of claim 11, wherein the filler layer comprises a plurality of discontinuous filler elements, each said filler elements filling a respective concave retroreflective element.

15. The retroreflective article of claim 11, wherein the filler layer is a continuous layer.

16. The retroreflective article of claim 11, wherein the waveband selective material has the value of the transmittance in the UV waveband that is higher than one or both the value of the transmittance in the visible waveband or the value of the transmittance in the IR waveband.

17. The retroreflective article of claim 11, wherein the particles of the waveband selective material comprise a phosphate glass that includes cobalt, nickel, or a combination of cobalt and nickel.

18. The retroreflective article of claim 17, wherein the particles of the waveband selective material are not greater than about 1 µm in size.

19. The retroreflective article of claim 11, wherein the filler layer comprises a first polymer transparent in the UV waveband.

20. The retroreflective article of claim 19, wherein the first polymer transparent in the UV waveband is selected from the group consisting of polyvinyl chloride (PVC), polytetrafluoroethylene, perfluoroalkoxy polymer, fluorinated ethylene propylene, acrylate polymers and silicone polymers.

21. The retroreflective article of claim 11, wherein the top layer comprises a second polymer transparent in the UV waveband.

22. The retroreflective article of claim 21, wherein the second polymer transparent in the UV waveband is selected form the group consisting of polyvinyl chloride (PVC), polytetrafluoroethylene, perfluoroalkoxy polymer, fluorinated ethylene propylene, acrylate polymers, and silicone polymers.

* * * * *